(12) United States Patent
Iwano et al.

(10) Patent No.: US 11,280,628 B2
(45) Date of Patent: Mar. 22, 2022

(54) IN-VEHICLE PROCESSING DEVICE

(71) Applicant: CLARION CO., LTD., Saitama (JP)

(72) Inventors: Katsumi Iwano, Yokohama (JP);
Shinya Tagawa, Saitama (JP);
Takayuki Kaneko, Saitama (JP)

(73) Assignee: CLARION CO., LTD., Saitama (JP)

( * ) Notice: Subject to any disclaimer, the term of this patent is extended or adjusted under 35 U.S.C. 154(b) by 182 days.

(21) Appl. No.: 16/715,742

(22) Filed: Dec. 16, 2019

(65) Prior Publication Data
US 2020/0209006 A1 Jul. 2, 2020

(30) Foreign Application Priority Data

Dec. 26, 2018 (JP) .............................. JP2018-242367

(51) Int. Cl.
*G01C 21/34* (2006.01)
*G01C 21/36* (2006.01)

(52) U.S. Cl.
CPC ..... *G01C 21/3492* (2013.01); *G01C 21/3484* (2013.01); *G01C 21/3691* (2013.01)

(58) Field of Classification Search
CPC combination set(s) only.
See application file for complete search history.

(56) References Cited

U.S. PATENT DOCUMENTS

| | | | |
|---|---|---|---|
| 10,671,075 B1 * | 6/2020 | Kobilarov | G05D 1/0088 |
| 2006/0116818 A1 | 6/2006 | Chao et al. | |
| 2010/0332130 A1 | 12/2010 | Shimizu et al. | |
| 2014/0244114 A1 | 8/2014 | Matsubara | |
| 2015/0345959 A1 | 12/2015 | Meuleau | |
| 2018/0099667 A1 | 4/2018 | Abe et al. | |
| 2018/0188047 A1 | 7/2018 | Inoue et al. | |
| 2018/0194344 A1 * | 7/2018 | Wang | G05D 1/0257 |
| 2020/0031340 A1 * | 1/2020 | Tao | B60W 30/0956 |

(Continued)

FOREIGN PATENT DOCUMENTS

| | | |
|---|---|---|
| CA | 2 990 772 | 12/2016 |
| CN | 107933560 | 4/2018 |

(Continued)

OTHER PUBLICATIONS

Extended European Search Report dated May 20, 2020 in corresponding European Patent Application No. 19215113.2.

*Primary Examiner* — James J Lee
*Assistant Examiner* — Sophia Antonia Skipper
(74) *Attorney, Agent, or Firm* — Wenderoth, Lind & Ponack, L.L.P.

(57) ABSTRACT

An in-vehicle processing device includes a storage part configured to store route information on routes on which a host vehicle has previously traveled; a candidate point generation part configured to generate a plurality of candidate points in a predetermined zone relative to a stored route of the route information stored in the storage part based on current peripheral information around the host vehicle and current information on the host vehicle; a candidate route generation part configured to generate a plurality of candidate routes by connecting the plurality of candidate points generated by the candidate point generation part; and a route selection part configured to select one of the plurality of candidate routes generated by the candidate route generation part.

8 Claims, 8 Drawing Sheets

(56) References Cited

U.S. PATENT DOCUMENTS

2020/0122721 A1\* 4/2020 Zhang ............... B60W 60/0027
2021/0148720 A1\* 5/2021 Yasui ..................... G01C 21/26
2021/0163010 A1\* 6/2021 Takabayashi ......... B60W 40/02

FOREIGN PATENT DOCUMENTS

| EP | 0 987 665 | 3/2000 |
| JP | 2000-55689 | 2/2000 |
| JP | 2017-134725 | 8/2017 |
| JP | 2018-62244 | 4/2018 |
| WO | 2006/060173 | 6/2006 |
| WO | 2010/001985 | 1/2010 |
| WO | 2013/051081 | 4/2013 |
| WO | 2018/175441 | 9/2018 |
| WO | 2018/230533 | 12/2018 |

\* cited by examiner

IN-VEHICLE PROCESSING DEVICE

CROSS-REFERENCE TO RELATED APPLICATION

The present application is based on and claims priority from Japanese Patent Application No. 2018-242367 filed on Dec. 26, 2018, the disclosure of which is hereby incorporated by reference in its entirety.

FIELD OF THE INVENTION

The present disclosure relates to an in-vehicle processing device for generating a route for a host vehicle.

BACKGROUND

Conventionally, it is known in the art to generate a route for a subject or host vehicle by using routes on which the host vehicle has previously traveled (see Patent Literature 1: JP 2017-134725 A, for example).

Patent Literature 1 discloses a route generation device that generates a route for the host vehicle based on the data of the routes on which the host vehicle has previously traveled.

However, Patent Literature 1 does not disclose a method for generating a route by the route generation device to avoid obstacles that have not previously existed in the route data.

Accordingly, an object of the present disclosure is to provide an in-vehicle processing device that generates a route for the host vehicle to avoid obstacles that have not previously existed in the routes on which the host vehicle has previously traveled.

SUMMARY

An in-vehicle processing device according to the present disclosure includes a storage part configured to store route information on routes on which a host vehicle has previously traveled; a candidate point generation part configured to generate a plurality of candidate points in a predetermined zone relative to a stored route of the route information stored in the storage part based on current peripheral information around the host vehicle and current information on the host vehicle; a candidate route generation part configured to generate a plurality of candidate routes by connecting the plurality of candidate points generated by the candidate point generation part; and a route selection part configured to select one of the plurality of candidate routes generated by the candidate route generation part.

DETAILED DESCRIPTION

Figure 1:
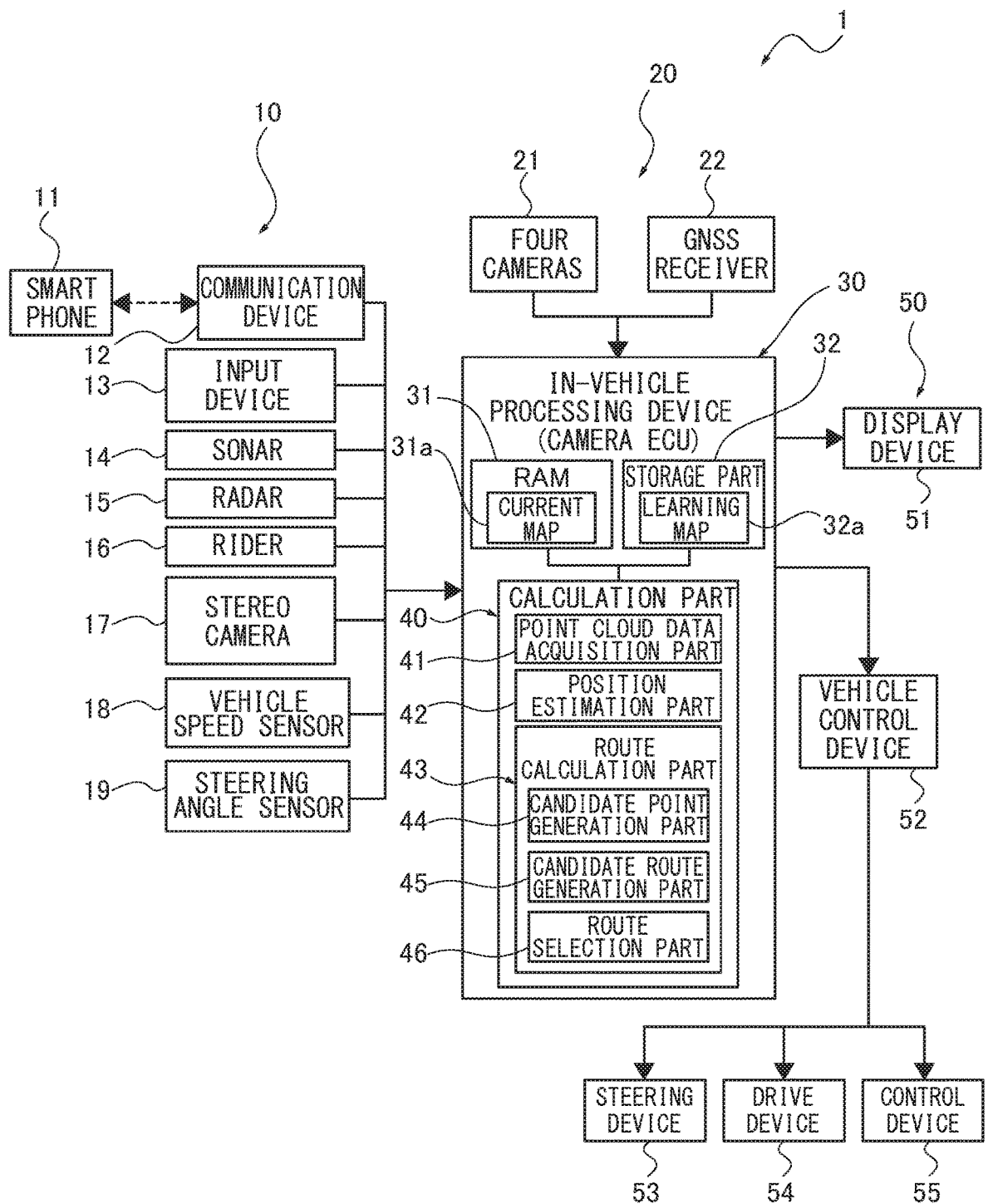
FIG. 1 is a structure diagram illustrating a travel route generation system according to Embodiment I.

Hereinafter, an in-vehicle processing device of the present disclosure will be described with reference to Embodiment I illustrated in the drawings.

An in-vehicle processing device in Embodiment I is installed in a vehicle such as an automobile. In Embodiment I, a case where a subject or host vehicle moves forward and enters a parking space in relation to the routes on which the host vehicle has previously traveled will be described.

Hereinafter, the configuration of the travel route generation system according to Embodiment I will be described with reference to FIG. 1. FIG. 1 is a structure diagram illustrating the travel route generation system according to Embodiment I.

A travel route generation system 1 in Embodiment I includes a first input part 10, a second input part 20, an in-vehicle processing device 30, and an output part 50.

The first input part 10 includes a communication device 12, an input device 13, a sonar 14, a radar 15, a rider 16, a stereo camera 17, a vehicle speed sensor 18, and a steering angle sensor 19. The communication device 12 bidirectionally communicates with a mobile terminal such as a smartphone 11.

The smartphone 11 includes an input screen. A user can enter or input an instruction on the input screen for entry to or exit from the parking space.

The communication device 12 is TCU (Telematics Communication Unit), for example, and configured to bidirectionally communicate with the smartphone 11. The communication device 12 receives information on entry to or exit from the parking space of the host vehicle and inputs to the in-vehicle processing device 30.

The input device 13 is a navigation system, for example, and contains map information. The map information is input to the in-vehicle processing device 30.

The sonar 14 is attached to a front bumper of the host vehicle, for example. The sonar 14 is configured to emit sound waves and receive the reflected waves from an obstacle to determine the direction from the host vehicle to the obstacle and measure the distance between the host vehicle and the obstacle. In other words, the sonar 14 is configured to determine and measure peripheral information around the host vehicle. The peripheral information around the host vehicle determined and measured by the sonar 14 is input to the in-vehicle processing device 30.

The radar 15 is attached to the front bumper of the host vehicle, for example. The radar 15 is configured to emit radio waves and receive the reflected radio waves from the obstacle to determine the direction from the host vehicle to the obstacle and measure the distance between the host vehicle and the obstacle. In other words, the radar 15 is configured to determine and measure the peripheral information around the host vehicle. The peripheral information around the host vehicle determined and measured by the radar 15 is input to the in-vehicle processing device 30.

The rider 16 is attached to the front bumper of the host vehicle, for example. The rider 16 is configured to emit laser light and receive the reflected laser light from the obstacle to determine the direction from the host vehicle to the obstacle and measure the distance between the host vehicle and the obstacle. In other words, the rider 16 is configured to determine and measure the peripheral information around the host vehicle. The peripheral information around the host vehicle determined and measured by the rider 16 is input to the in-vehicle processing device 30.

The stereo camera 17 is attached in the vicinity of a rear-view mirror, for example. The stereo camera 17 is configured to determine the direction from the host vehicle to the obstacle and measure the distance between the host vehicle and the obstacle based on image information. In other words, the stereo camera 17 is configured to determine and measure the peripheral information around the host vehicle. The peripheral information around the host vehicle determined and measured by the stereo camera 17 is input to the in-vehicle processing device 30.

The vehicle speed sensor 18 is configured to detect the vehicle speed of the host vehicle. In other words, the vehicle speed sensor 18 is configured to detect information on the host vehicle. The information on the host vehicle detected by the vehicle speed sensor 18 is input to the in-vehicle processing device 30.

The steering angle sensor 19 is configured to detect the steering angle of the steering of the host vehicle. In other words, the steering angle sensor 19 is configured to detect information on the host vehicle. The information on the host vehicle detected by the steering angle sensor 19 is input to the in-vehicle processing device 30.

The second input part 20 includes four cameras 21, and a GNSS receiver 22 (or a GPS receiver).

The cameras 21 are attached to the front bumper, a rear bumper, door mirrors and the like of the host vehicle, respectively. Each of the cameras 21 is configured to photograph or shoot the periphery of the host vehicle in a shooting range different from the shooting ranges of the other cameras 21. The entire periphery of the host vehicle can be covered by combining the shooting ranges of all of the cameras 21. In other words, each of the cameras 21 is configured to photograph or shoot peripheral information around the host vehicle. The peripheral information around the host vehicle photographed by the cameras 21 is input to the in-vehicle processing device 30.

The GNSS receiver 22 is configured to receive signals from a plurality of satellites which constitute a satellite navigation system, and calculate the position (latitude and longitude, for example) of the GNSS receiver 22 by calculation based on the received signals. The position information calculated by the GNSS receiver 22 is input to the in-vehicle processing device 30.

The in-vehicle processing device 30 includes RAM 31, a storage part 32, and a calculation part 40, and is configured as a travel route generation device.

RAM 31 is configured to store a current map 31a around the host vehicle. The current map 31a is generated based on the map information from the input device 13, the peripheral information around the host vehicle from the sonar 14, the radar 15, the rider 16, the stereo camera 17 and the cameras 21, and the position information calculated by the GNSS receiver 22.

The storage part 32 is configured to store a learning map 32a. The learning map 32a is generated based on the map information from the input device 13, the peripheral information around the host vehicle input from the sonar 14, the radar 15, the rider 16, the stereo camera 17 and the cameras 21, and the position information calculated by the GNSS receiver 22.

The learning map 32a includes information on the routes (also referred to as route information) on which the host vehicle has previously traveled. The route information includes information on stored routes on which the host vehicle has previously traveled and information on obstacles that exist around the stored routes. The information on the stored routes is stored as node points arranged at approximately one-meter intervals, for example. The information on the obstacles is stored as target points, for example.

The calculation part 40 includes a point cloud data acquisition part 41, a position estimation part 42, and a route calculation part 43. The calculation part 40 is configured to entirely control the in-vehicle processing device 30.

The point cloud data acquisition part 41 is configured to acquire the learning map 32a. The position estimation part 42 is configured to estimate the position of the host vehicle on the current map 31a from the position information calculated by the GNSS receiver 22.

The output part 50 includes a display device 51, a vehicle control device 52, a steering device 53, a drive device 54, and a control device 55.

The display device 51 is configured to display processed information calculated by the route calculation part 43. The vehicle control device 52 is configured to calculate the control amount of a steering as the steering device 53, an accelerator as the drive device 54, and a shift and a brake as the control device 55 based on the processed information calculated by the route calculation part 43, and provide instructions to the steering device 53, the drive device 54, and the control device 55

FIGS. 2 to 5 are explanatory views illustrating the process of the route calculating part according to Embodiment I. Hereinafter, the process of the route calculating part according to Embodiment I will be described with reference to FIGS. 2 to 5.

As shown in FIG. 1, the route calculation part 43 includes a candidate point generation part 44, a candidate route generation part 45, and a route selection part 46.

Figure 2:
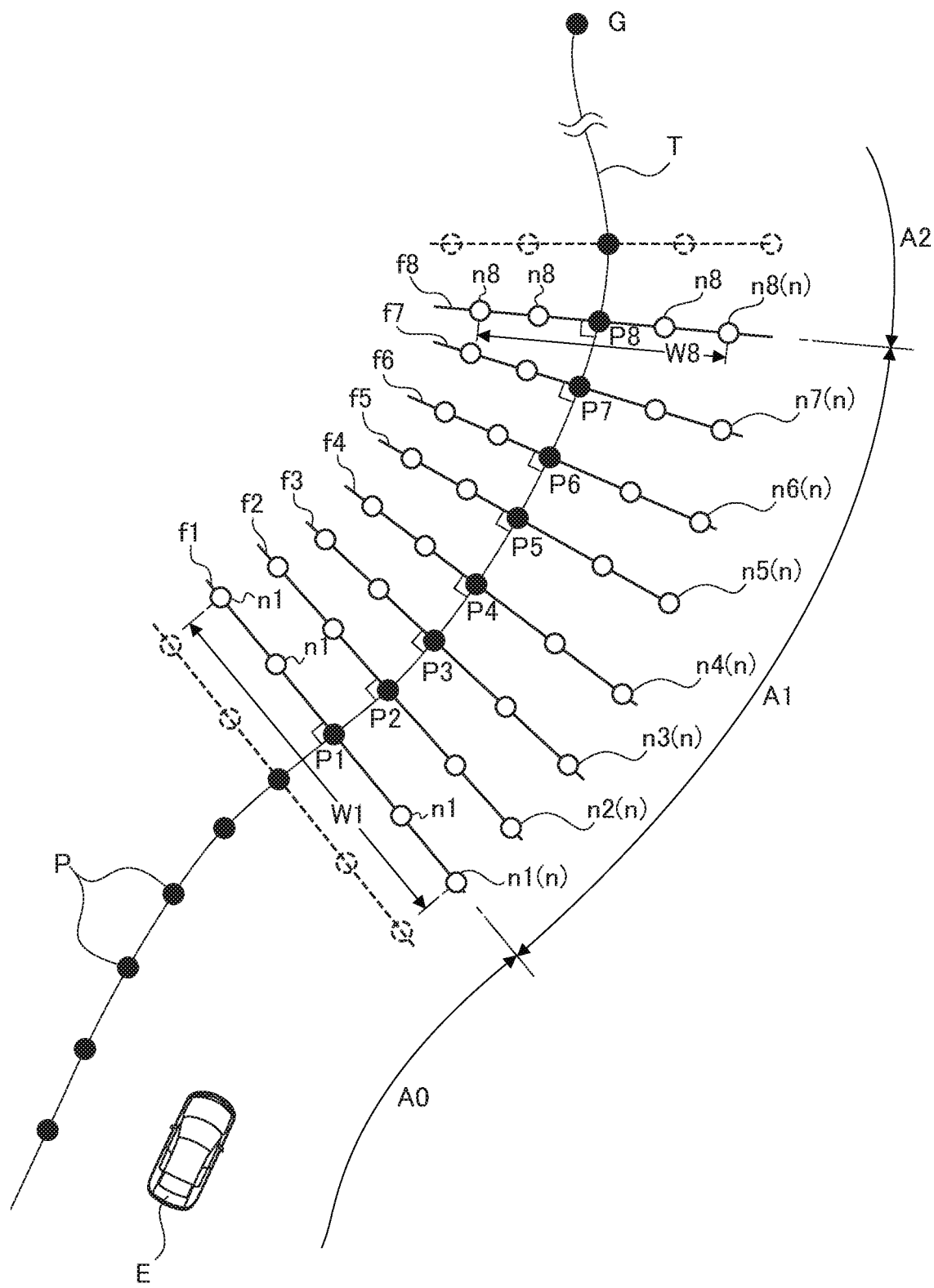
FIG. 2 is an explanatory view illustrating the processing of a route calculation part according to Embodiment I.

As shown in FIG. 2, the candidate point generation part 44 is configured to generate a plurality of candidate points n in a predetermined zone A1 relative to the stored route T of the learning map 32a stored in the storage part 32 based on the current peripheral information around the host vehicle and the current information on the host vehicle.

The stored route T is formed to a destination point (parking location) G by connecting a plurality of node points P. The candidate points n are generated in the predetermined zone A1 forward of a zone A0 where the host vehicle E is now traveling. The candidate points n are respectively arranged on perpendicular lines f1 to f8 relative to the stored route T along with node points P1 to P8 of the zone A1. The four candidate points n1 are equally distributed on the perpendicular line f1 relative to the node point P1 as shown in FIG. 2. In other words, two candidate points n1 are arranged on each side of the node point P1 on the perpendicular line f1. Similarly, four candidate points n2 to n8 are equally arranged on the perpendicular lines f2 to f8 relative to the node points P2 to P8.

Figure 3:
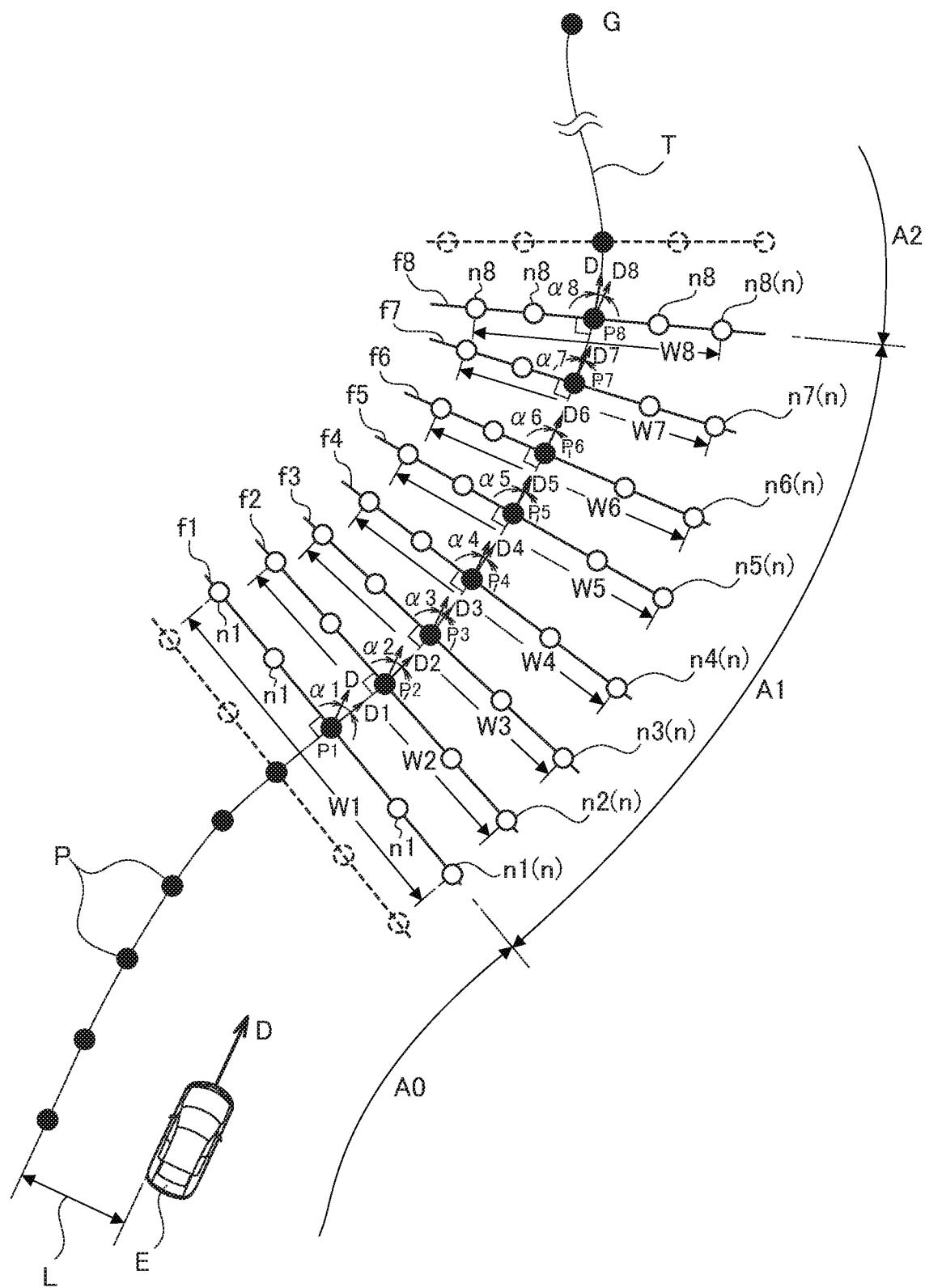
FIG. 3 is an explanatory view illustrating the processing of the route calculation part according to Embodiment I.

As shown in FIG. 3, the candidate point generation part 44 is configured to generate the candidate points n based on the posture or attitude of the host vehicle E relative to the stored route T, which is the current information of the host vehicle. The larger the angle between the travel direction D in the zone A0 of the host vehicle E and the tangent direction relative to the stored route T at each node point P, the more the candidate point generation part 44 increases the maximum width W between the outermost candidate points n. In other words, the larger the angle between the travel direction D in the zone A0 of the host vehicle E and the tangent direction relative to the stored route T at each node point P, the more the candidate point generation part 44 increases the intervals between the adjacent candidate points n. Specifically, the candidate point generation part 44 generates the candidate points n based on the angle $\alpha 1$ between the travel direction D in the zone A0 of the host vehicle E and the tangent direction D1 relative to the stored route T at the node point P1. Similarly, the candidate point generation part 44 generates the candidate points n based on each of the angles $\alpha 2$ to $\alpha 8$ between the travel direction D in the zone A0 of the host vehicle E and each of the tangent directions D2 to D8 relative to the stored route T at each of the node points P2 to P8.

For example, the angle $\alpha 1$ between the travel direction D and the node point P1 is larger than the angle $\alpha 8$ between the travel direction D and the node point P8. In this case, the maximum width W1 between the outermost candidate points n1 arranged in relation to the node point P1 is larger than the maximum width W8 between the outermost candidate points n8 arranged in relation to the node point P8. Accordingly, the intervals between the adjacent candidate points n1 at the node point P1 become relatively larger.

The route calculation part 43 is configured to calculate each angle between the travel direction D in the zone A0 of the host vehicle E and each of the tangent directions relative to the stored route T at each of the node points P.

As shown in FIG. 3, the candidate point generation part 44 generates the plurality of candidate points n based on the position of the host vehicle E relative to the stored route T, which is the current information on the host vehicle. The larger a distance from the host vehicle E traveling in the zone A0 to the stored route T in the vehicle width direction (i.e. the amount of transverse deviation) L, the more the candidate point generation part 44 increases the maximum width between the outermost candidate points n. In other words, the larger a distance from the host vehicle E traveling in the zone A0 to the stored route T in the vehicle width direction (i.e. the amount of transverse deviation) L, the more the candidate point generation part 44 increases the intervals between the adjacent candidate points n.

For example, in the case where the distance (the amount of transverse deviation) L is relatively larger, the maximum width W1 between the outermost candidate points n1 arranged in relation to the node point P1 becomes larger compared to a case where the distance (the amount of transverse deviation) L is relatively smaller. Similarly, in the case where the distance (the amount of transverse deviation) L is relatively larger, the maximum widths W2 to W8 between the outermost candidate points n2 to n8 arranged in relation to node points P2 to P8 become larger than a case where the distance (the amount of transverse deviation) L is relatively smaller.

The route calculation part 43 calculates the amount of transverse deviation L of the host vehicle E relative to the stored route T based on the learning map 32a acquired by the point cloud data acquisition part 41 and the position of the host vehicle E on the current map 31a estimated by the position estimation part 42. In other words, the route calculation part 43 calculates the amount of transverse deviation L by using the coordinates of the current position of the host vehicle E and the coordinates of the stored route T on the basis of the world coordinate system. The amount of transverse deviation L (also referred to as the transverse deviation amount L) is a distance that the host vehicle E is away from the stored route T in a direction perpendicular to the traveling direction vector of the host vehicle E. In other words, the amount of transverse deviation L is a distance in the vehicle width direction from the host vehicle E to the stored route T.

Figure 4:
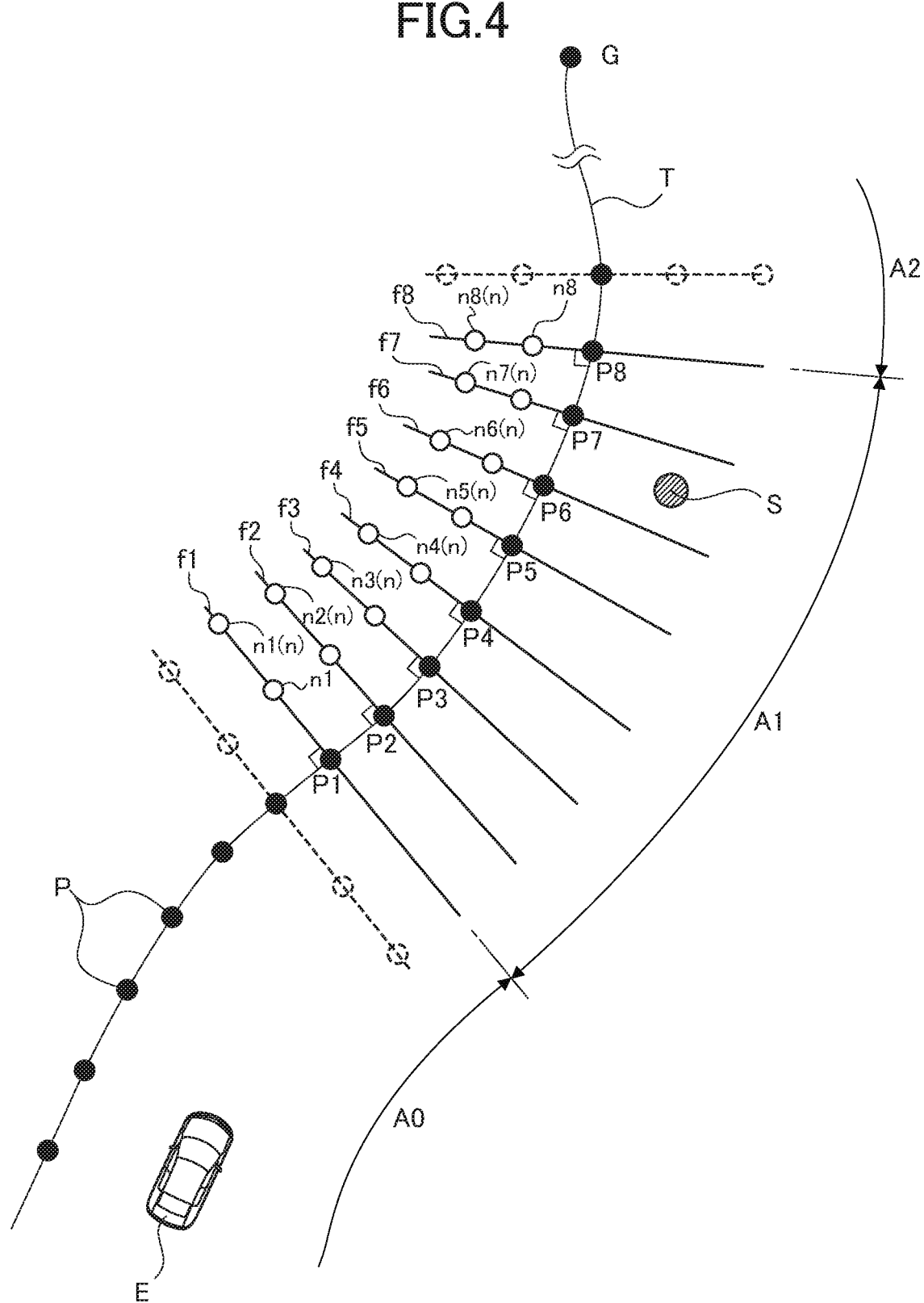
FIG. 4 is an explanatory view illustrating the processing of the route calculation part according to Embodiment I.

As shown in FIG. 4, when the obstacle S is identified in the zone A1 from the peripheral information of the host vehicle E while the host vehicle E is traveling in the zone A0, the candidate point generation part 44 does not generate candidate points n on the side of the stored route T where the obstacle S exists. In other words, when the obstacle S is identified in the zone A1 from the peripheral information of the host vehicle E while the host vehicle E is traveling in the zone A0, the candidate point generation part 44 generates the candidate points n only on the other side of the stored route T opposite to the side where the obstacle S exists.

In this case, the candidate point generation part 44 may generate the two candidate points n1 to n8 on each of the perpendicular lines f1 to f8 on the side where the obstacle S does not exist as shown in FIG. 4. Alternatively, the candidate point generation part 44 may generate the four candidate points n1 to n8 on each of the perpendicular lines f1 to f8 on the side where the obstacle S does not exist.

The route calculation part 43 determines whether the obstacle S exists in the zone A1 forward of the zone A0 in which the host vehicle E is traveling. The obstacle S may be a moving object (e.g. vehicles) or a stationary object.

Figure 5:
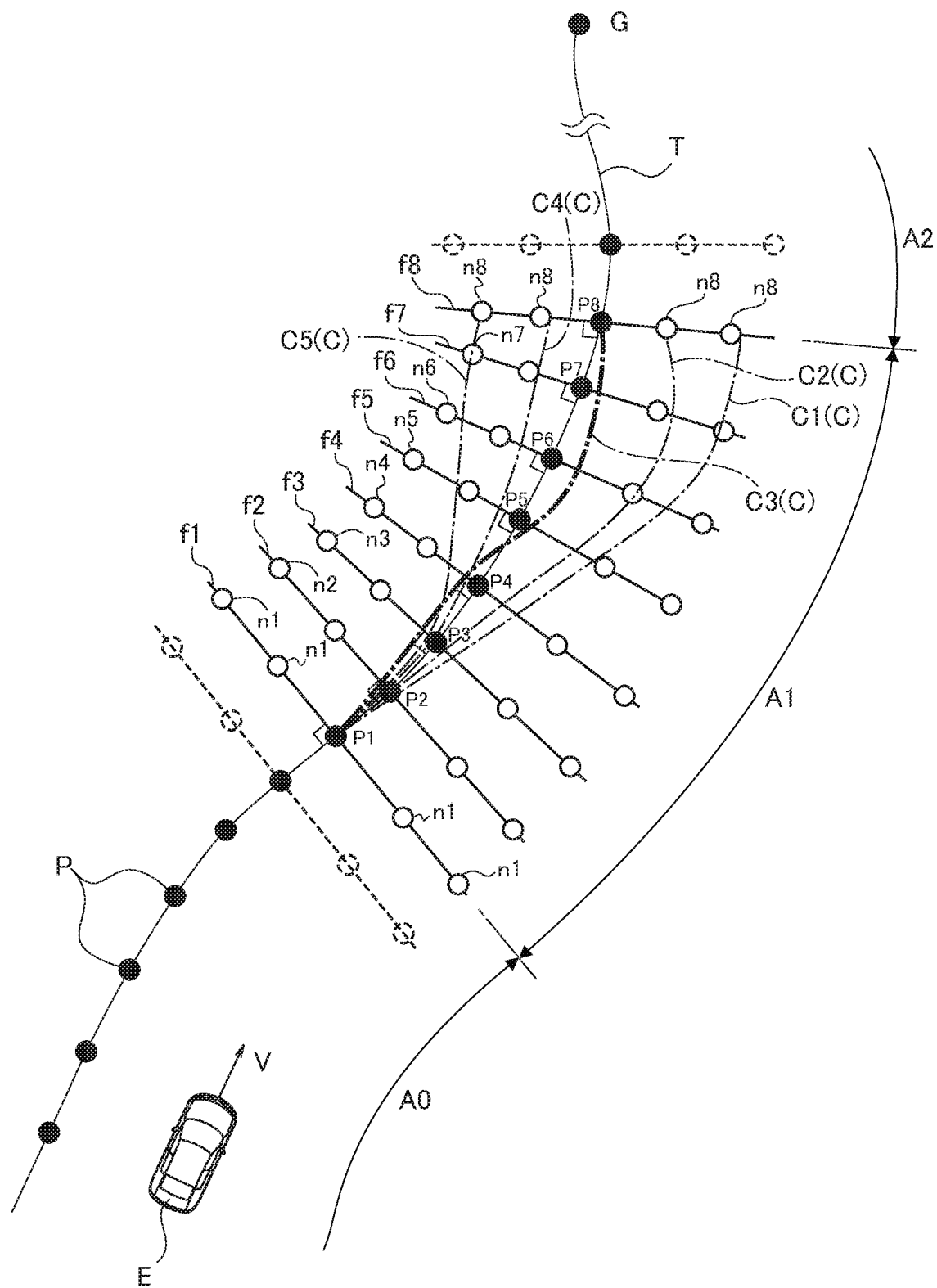
FIG. 5 is an explanatory view illustrating the processing of the route calculation part according to Embodiment I.

As shown in FIG. 5, the candidate route generation part 45 generates a plurality of candidate routes C by connecting the candidate points n generated by the candidate point generation part 44. The candidate route generation part 45 generates the plurality of candidate routes C in the zone A1 based on the speed V of the host vehicle E traveling in the zone A0. The candidate route generation part 45 selects the candidate points n to be connected (the candidate points n8, for example) further away from the host vehicle E when the speed of the host vehicle E is relatively higher. On the other hand, the candidate route generation part 45 selects the candidate points n to be connected (the candidate points n7, for example) closer to the host vehicle E when the speed of the host vehicle E is relatively slower. In Embodiment I, five candidate routes C1 to C5 are generated. The candidate points n include the node points P. In the example shown in FIG. 5, the node point P1 is connected to each of the candidate points n8 to generate the candidate routes C1, C2, C4, and C5. Also, the node point P1 is connected to the node point P8 to generate the candidate routes C3.

The route selection part 46 selects one of the candidate routes by weighting the five candidate routes C1 to C5 with the total distances, the sum of curvatures, and the position of the host vehicle E with respect to the stored route T.

The route selection part 46 weights the candidate routes C1 to C5 and evaluates one of the candidate routes which has the shortest overall distance as the highest grade. In other words, the route selection part 46 selects one of the candidate routes by considering the overall distances of the candidate routes C.

The route selection part 46 weights the candidate routes C1 to C5 and evaluates one of the candidate routes which has the smallest sum of curvatures as the highest grade. The sum of curvatures is an area formed by the stored route T and the candidate routes C and is the sum of the yaw rate. In other words, the route selection part 46 selects one of the candidate routes by considering the sum of curvatures of the candidate routes C.

The route selection part 46 weights the candidate routes C1 to C5 and evaluates one of the candidate routes which has the smallest distance in the vehicle width direction (transverse deviation amount) L from the host vehicle E traveling in the zone A0 to the stored route T as the highest grade. In other words, the route selection part 46 selects one of the candidate routes by considering the position of the host vehicle E relative to the stored route T.

In this way, the route is generated in the zone A1 forward of the zone A0 while the host vehicle E is traveling in the zone A0. Further, the route is generated in a zone A2 while the host vehicle E is traveling in the zone A1, and consequently, the route to the destination point G is generated.

Figure 6:
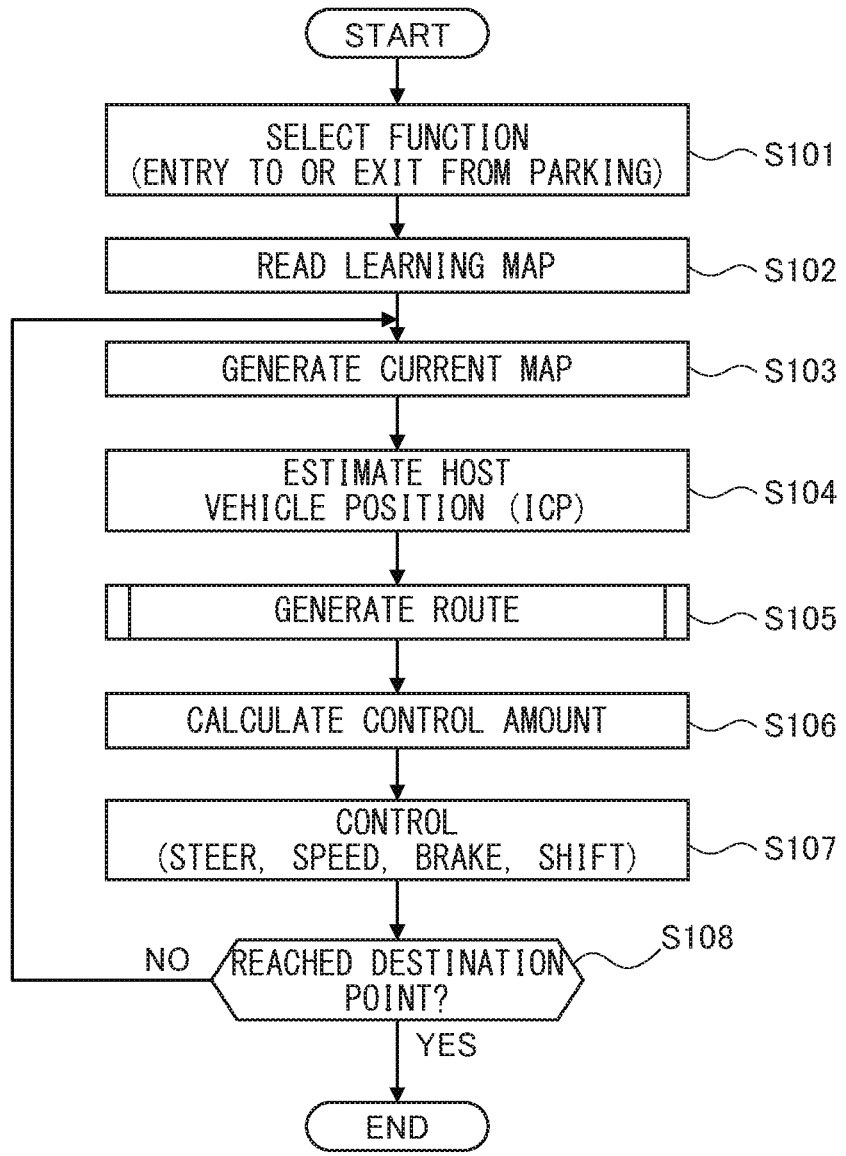
FIG. 6 is a flowchart showing the system flow of an in-vehicle processing device according to Embodiment I.
Figure 7:
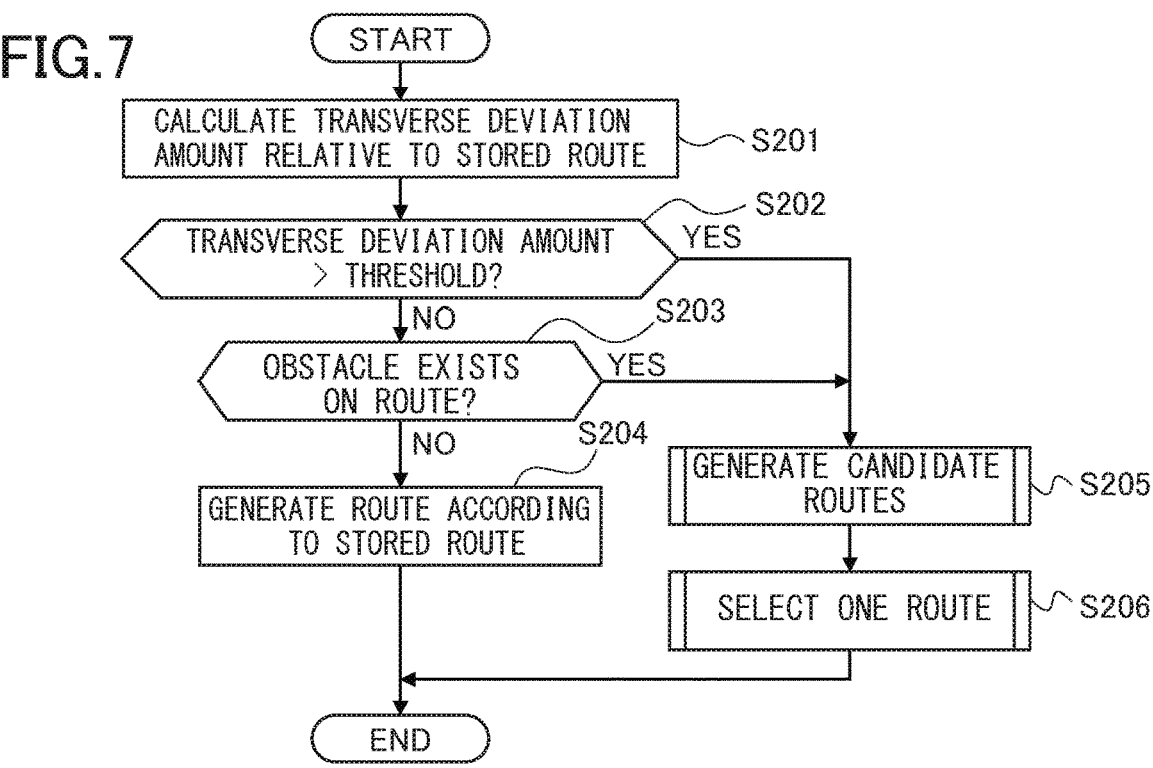
FIG. 7 is a flowchart showing the flow of the route generation by the route calculation part according to Embodiment I.
Figure 8:
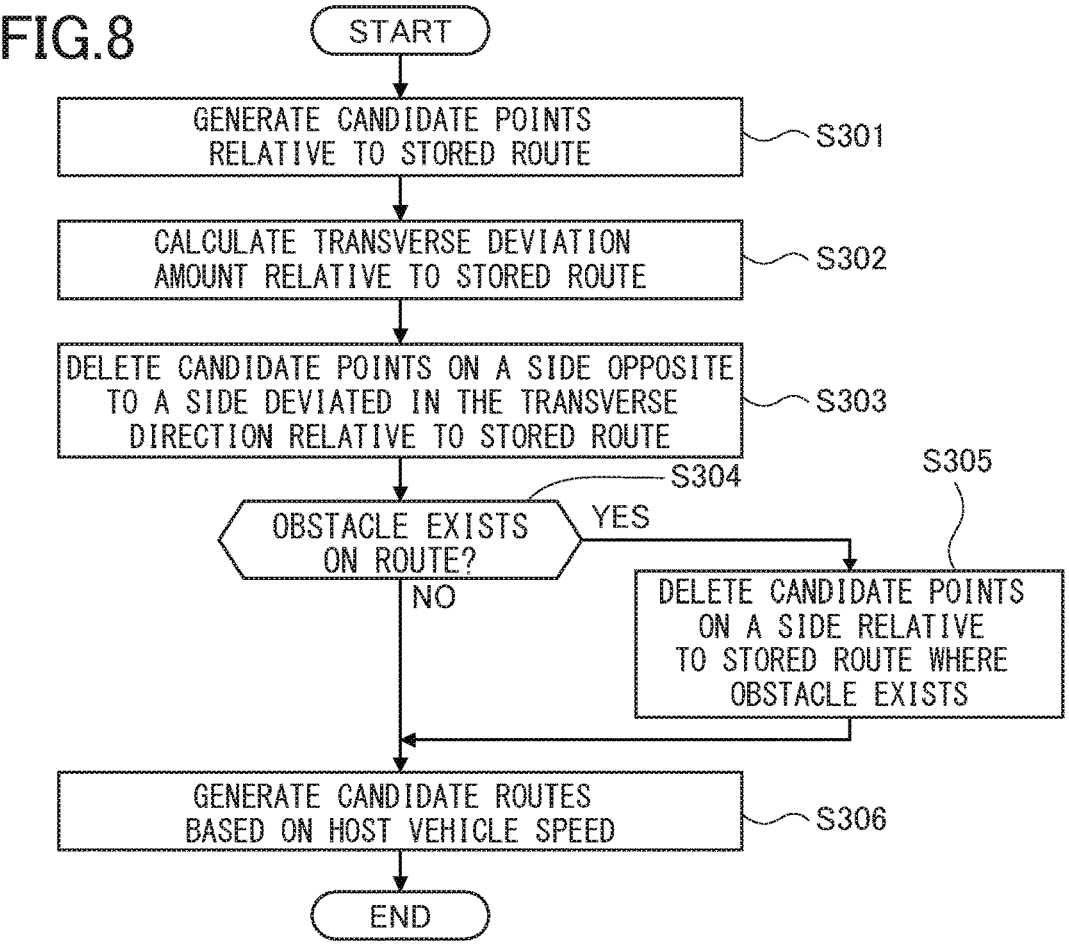
FIG. 8 is a flowchart showing the flow of the candidate routes generation by the route calculation part according to Embodiment I.
Figure 9:
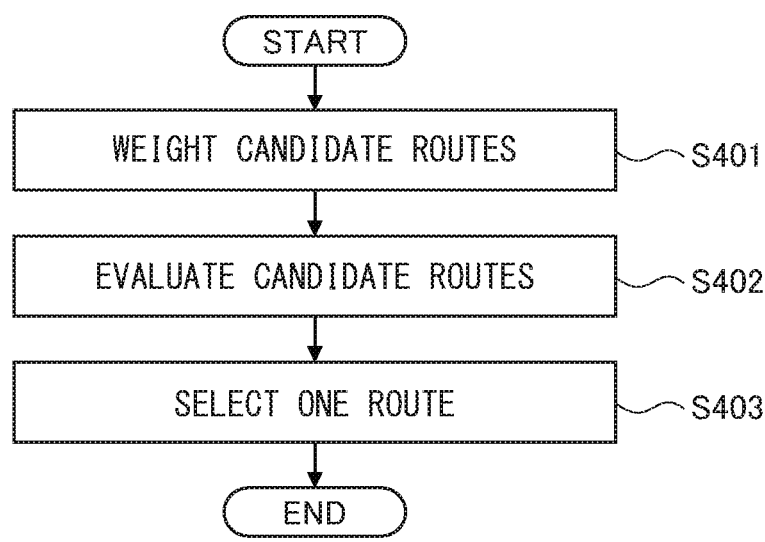
FIG. 9 is a flowchart showing the flow of the route selection by the route calculation part according to Embodiment I.

Hereinafter, the processing flow of the route calculation part according to Embodiment I will be described with reference to FIGS. 6 to 9. FIG. 6 is a flowchart showing the system flow of the in-vehicle processing device according to Embodiment I. FIG. 7 is a flowchart showing the flow of the route generation by the route calculation part according to Embodiment I. FIG. 8 is a flowchart showing the flow of generating the candidate routes by the route calculation part according to Embodiment I. FIG. 9 is a flowchart showing the flow of the route selection by the route calculation part according to Embodiment I.

As shown in FIG. 6, the user inputs on the smartphone 11 the instruction regarding entry to or exit from the parking space (Step S101), and the calculation part 40 reads the learning map 32*a* around the host vehicle from the position information calculated by the GNSS receiver 22 (Step S102). Then, the calculation part 40 generates the current map 31*a* (Step S103). The position estimation part 42 estimates the position of the host vehicle on the current map 31*a* from the position information calculated by the GNSS receiver 22 (Step S104).

Next, the route calculation part 43 performs the route generation process, which will be described later, with regard to the zone A1 forward of the zone A0 in which the host vehicle E is traveling (Step S105). Then, the vehicle control device 52 calculates control amounts for the steering device 53, the drive device 54 and the control device 55 based on the processed information calculated by the route calculation part 43 (Step S106), and provides the calculated control amounts to the steering device 53, the drive device 54, and the control device 55.

Next, the steering device 53, the drive device 54, and the control device 55 are controlled in accordance with the calculated control amounts and the host vehicle E travels in the zone A1 (Step S107).

Then, the calculation part 40 determines whether the host vehicle E has reached the destination point G or not (Step S108). In the case where the calculation part 40 determines that the host vehicle E has reached the destination point G (YES in Step S108), the system flow of the in-vehicle processing device 30 is terminated. On the other hand, in the case where the calculation part 40 determines that the host vehicle E has not reached the destination point G yet (NO in Step S108), the flow returns to Step S103.

As shown in FIG. 7, the route calculation part 43 calculates the distance in the vehicle width direction (transverse deviation amount) L relative to the stored route T (Step S201).

Next, the route calculation part 43 determines whether the transverse deviation amount L is larger than a predetermined threshold or not (Step S202). In the case where the route calculation part 43 determines that the transverse deviation amount L is larger than the predetermined threshold (YES in Step S202), the flow proceeds to Step S205. The route calculation part 43 calculates the transverse deviation amount L by using the coordinates of the current location of the host vehicle E and the coordinates of the stored route T on the basis of the world coordinate system. The transverse deviation amount L is the distance that the host vehicle E is away from the stored route T in the direction perpendicular to the traveling direction vector of the host vehicle E. In other words, the transverse deviation amount L is the distance in the vehicle width direction from the host vehicle E to the stored route T.

In the case where the route calculation part 43 determines that the transverse deviation amount L is smaller than the predetermined threshold (NO in Step S202), the flow proceeds to Step S203.

In Step S203, the route calculation part 43 determines from the learning map 32*a* whether the obstacle S exists within a predetermined range from the stored route T in the zone A1. In the case where the route calculation part 43 determines that the obstacle S does not exist within the predetermined range from the stored route T in the zone A1 (NO in Step S203), the route calculation part 43 generates one route in accordance with the stored route T (Step S204) and terminates the route generation process. On the other hand, in the case where the route calculation part 43 determines that the obstacle S exists within the predetermined range from the stored route T in the zone A1 (YES in Step S203), the flow proceeds to Step S205.

In Step S205, the process for generating the candidate routes is performed, which will be described later. Then, the route selection process, which will be described later, is performed (Step S206) and then the route generation process is terminated.

As shown in FIG. 8, the candidate point generation part 44 generates the plurality of candidate points n in relation to the stored route T (Step S301). Then, the candidate point generation part 44 calculates the transverse deviation amount L of the host vehicle E relative to the stored route T based on the learning map 32*a* acquired by the point cloud data acquisition part 41 and the position of the host vehicle E on the current map 31*a* estimated by the position estimation part 42. It should be noted that the transverse deviation amount L calculated by the route calculation part 43 may be used.

Then, the candidate point generation part 44 deletes the candidate points on the side opposite to the side deviated in the transverse direction relative to the stored route T (Step S303).

Next, the candidate point generation part 44 determines whether the obstacle S exists within the predetermined range from the stored route T in the zone A1 (Step S304). In the case where the candidate point generation part 44 determines that the obstacle S exists within the predetermined range from the stored route T in the zone A1 (YES in Step S304), the candidate point generation part 44 deletes the candidate points n on the side relative to the stored route T where the obstacle S exists (Step S305), and then the flow proceeds to Step S306.

On the other hand, in the case where the candidate point generation part 44 determines that the obstacle S does not exist within the predetermined range from the stored route T in the zone A1 (NO in Step S304), the flow proceeds to Step S306.

In Step S306, the candidate route generation part 45 generates the plurality of the candidate routes C based on the speed of the host vehicle E (Step S306) and then terminates the process for generating the candidate routes.

As shown in FIG. 9, the route selection part 46 weights the candidate routes C with the total distances, the sum of curvatures, and the position of the host vehicle E with respect to the stored route T (Step S401). Then, the route selection part 46 evaluates the candidate routes C (Step S402). Finally, the route selection part 46 selects one of the routes (Step S403) and then terminates the route selection process.

The in-vehicle processing device 30 of Embodiment I includes the storage part 32 configured to store the route information (learning map 32a) on the routes on which the host vehicle E has previously traveled; the candidate point generation part 44 configured to generate the plurality of candidate points n in a predetermined zone A1 relative to the stored route T of the route information (learning map 32a) stored in the storage part 32 based on the current information on the host vehicle E and the current peripheral information of the host vehicle E; the candidate route generation part 45 configured to generate the plurality of candidate routes C by connecting the plurality of candidate points n generated by the candidate point generation part 44; and the route selection part 46 configured to select one of the plurality of candidate routes C generated by the candidate route generation part 45 (FIG. 1).

Thereby, the route can be generated to avoid the obstacle S which has not previously existed on the route information (learning map 32a) stored in the storage part 32. Accordingly, the route can be generated while avoiding the obstacle S in real-time.

In the in-vehicle processing device 30 of Embodiment I, the candidate point generation part 44 generates the plurality of candidate points n based on the attitude of the host vehicle E relative to the stored route T (see FIG. 3).

Thereby, the candidate points n can be generated to have wider intervals between the adjacent candidate points n in the width direction of the stored route T in the case where the deviation amount of the attitude of the host vehicle E relative to the stored route T is relatively larger. On the other hand, the candidate points n can be generated to have narrower intervals between the adjacent candidate points n in the width direction of the stored route T in the case where the deviation amount of the attitude of the host vehicle E relative to the stored route T is relatively smaller. Accordingly, the route can be generated in accordance with the behavior of the host vehicle E.

In the in-vehicle processing device 30 of Embodiment I, the candidate point generation part 44 generates the plurality of candidate points n based on the position of the host vehicle E relative to the stored route T (FIG. 3).

Thereby, the intervals between the adjacent candidate points n in the width direction of the stored route T can be widened in the case where the deviation amount of the host vehicle E relative to the stored route T is relatively larger. On the other hand, the intervals between the adjacent candidate points n in the width direction of the stored route T can be narrowed in the case where the deviation amount of the host vehicle E relative to the stored route T is relatively smaller. Accordingly, the route can be generated in accordance with the behavior of the host vehicle E.

In the in-vehicle processing device 30 of Embodiment I, the candidate point generation part 44 generates the plurality of candidate points n on the side opposite to the side where the obstacle S exists relative to the stored route T when the current peripheral information includes information on the obstacle S (see FIG. 4).

Thereby, the generation of useless candidate points n can be avoided. Accordingly, the generation of useless candidate routes C can be avoided. As a result, the processing speed for generating the route can be increased.

In the in-vehicle processing device 30 of Embodiment I, the candidate route generation part 45 generates the plurality of the candidate routes C based on the speed of the host vehicle E (see FIG. 5).

Thereby, the candidate points n further away from the host vehicle E can be selected as the candidate points n to be connected to generate the candidate routes C1 to C5 when the speed of the host vehicle E is relatively higher. On the other hand, the candidate points n closer to the host vehicle E can be selected as the candidate points n to be connected to generate the candidate routes C1 to C5 when the speed of the host vehicle E is relatively slower. Therefore, the sudden steering operation to change the direction of travel can be avoided.

In the in-vehicle processing device 30 of Embodiment I, the route selection part 46 selects one of the candidate routes by considering the overall distances of the candidate routes C (see FIG. 5).

Accordingly, the shortest route among the candidate routes C1 to C5 can be selected. Therefore, it is possible to select the route easier to return to the stored route T which is not easily affected by disturbance. In addition, the host vehicle can be parked in narrow parking spaces since the host vehicle E can be driven in a very small area, and the turning radius of the host vehicle E can be increased.

In the in-vehicle processing device 30 of Embodiment I, the route selection part 46 selects one of the routes by considering the sum of curvatures of the candidate routes C.

Thereby, the candidate route C with the small sum of the curvatures can be selected. Accordingly, the selected route can be of less discomfort, and the load on the host vehicle E can be reduced. In addition, the host vehicle can be parked in narrow parking spaces since the turning radius of the host vehicle E can be increased.

In the in-vehicle processing device 30 of Embodiment I, the route selection part 46 selects one of the routes by considering the position of the host vehicle E relative to the stored route T.

Thereby, the route with the smaller deviation amount of the host vehicle E relative to the stored route T can be selected. Accordingly, the host vehicle E can travel on the smooth route, which can be closer to the driving characteristics of the driver.

The in-vehicle processing device of the present disclosure has been described with reference to Embodiment I. However, the specific configuration of the in-vehicle processing device is not limited to one described with reference to this embodiment, and modification, changes to designs and additions are allowed without departing from the scope of the claimed inventions.

In Embodiment I, the four candidate points n are generated relative to the node points P1 to P8 in the zone A1. However, the number of candidate points is not limited to four, and more or less than four candidate points may be used.

In Embodiment I, the route selection part 46 weights the candidate routes C1 to C5 with the total distances, the sum of curvatures, and the position of the host vehicle E relative to the stored route T to select one of the routes. However, the route selection part 46 may select one of the routes based on any one of the sum of curvatures, and the position of the host vehicle E relative to the stored route T to select one of the routes or may select one of the routes in accordance with other conditions.

In Embodiment I, the candidate point generation part 44 does not generate the candidate points n on the side where the obstacle S exists relative to the stored route T. However, the candidate point generation part may generate the candidate points in locations to avoid the stored route T in the case where the obstacle S exists on the stored route T.

In Embodiment I, the present disclosure is applied to the case where the host vehicle E travels forward to enter the parking space in relation to the route the host vehicle E has previously traveled. However, the present disclosure may also be applied to a case where the host vehicle E travels backward to enter the parking space in relation to the route the host vehicle E has previously traveled.

Although the present disclosure has been described in terms of exemplary embodiments, it should not be limited thereto. It should be appreciated that variations or modifications may be made in the embodiment described by persons skilled in the art without departing from the scope of the invention as defined by the following claims.

What is claimed is:

1. An in-vehicle processing device comprising:
    a processor; and
    a non-transitory computer-readable medium having stored thereon executable instructions that, when executed by the processor, cause the in-vehicle processing device to function as:
    a storage part configured to store route information on routes on which a host vehicle has previously traveled;
    a candidate point generation part configured to generate a plurality of candidate points in a predetermined zone relative to a stored route of the route information stored in the storage part based on current peripheral information around the host vehicle and current information on the host vehicle;
    a candidate route generation part configured to generate a plurality of candidate routes to a parking space by connecting the plurality of candidate points generated by the candidate point generation part; and
    a route selection part configured to select one of the plurality of candidate routes to the parking space generated by the candidate route generation part,
    wherein:
    the candidate point generation part is configured to generate the plurality of candidate points on a side opposite to a side where an obstacle exists relative to the stored route when the current peripheral information comprises information on the obstacle;
    the in-vehicle processing device is configured to output processed information calculated by the route selection part to a vehicle control device for providing control instructions to at least one of a steering device, a drive device, a shift device, or a brake device based on the processed information calculated by the route selection part;
    the candidate point generation part is configured to calculate a transverse deviation amount of the host vehicle relative to the stored route based on the stored route and a position of the host vehicle; and
    the transverse deviation amount is a distance in a vehicle width direction from the host vehicle to the stored route.

2. The in-vehicle processing device according to claim 1, wherein the candidate point generation part is configured to generate the plurality of candidate points based on an attitude of the host vehicle relative to the stored route.

3. The in-vehicle processing device according to claim 1, wherein the candidate point generation part is configured to generate the plurality of candidate points based on the position of the host vehicle relative to the stored route.

4. The in-vehicle processing device according to claim 1, wherein the candidate route generation part is configured to generate the plurality of candidate routes based on a speed of the host vehicle.

5. The in-vehicle processing device according to claim 1, wherein the route selection part is configured to select one of the candidate routes by considering overall distances of the candidate routes.

6. The in-vehicle processing device according to claim 1, wherein the route selection part is configured to select one of the candidate routes by considering a sum of curvatures of the candidate routes.

7. The in-vehicle processing device according to claim 1, wherein the route selection part is configured to select one of the candidate routes by considering the position of the host vehicle relative to the stored route.

8. The in-vehicle processing device according to claim 1, wherein the candidate point generation part is configured to increase intervals between the candidate points when the transverse deviation amount is larger than a predetermined threshold.

* * * * *